United States Patent
Howell et al.

(10) Patent No.: US 6,948,650 B2
(45) Date of Patent: *Sep. 27, 2005

(54) DROSS REMOVAL AND SOLDER RECLAMATION IMPROVEMENTS

(75) Inventors: Keith A. Howell, Osage Beach, MO (US); James M. Morris, Lebanon, MO (US); David M. McDonald, Camdenton, MO (US); Eric Wayne Becker, Lebanon, MO (US); Joseph Wayne Brickell, Linn Creek, MO (US)

(73) Assignee: Speedline Technologies, Inc., Franklin, MA (US)

( * ) Notice: Subject to any disclaimer, the term of this patent is extended or adjusted under 35 U.S.C. 154(b) by 15 days.

This patent is subject to a terminal disclaimer.

(21) Appl. No.: 10/445,787

(22) Filed: May 27, 2003

(65) Prior Publication Data

US 2004/0011851 A1 Jan. 22, 2004

Related U.S. Application Data

(63) Continuation-in-part of application No. 09/759,506, filed on Jan. 12, 2001, now Pat. No. 6,592,017, which is a continuation-in-part of application No. 10/051,407, filed on Jan. 18, 2002, now Pat. No. 6,666,370.

(51) Int. Cl.[7] .................................................. B23K 31/02
(52) U.S. Cl. ........................ 228/260; 228/259; 228/34
(58) Field of Search .......................... 228/260, 259, 228/34–36, 257; 210/525, 528

(56) References Cited

U.S. PATENT DOCUMENTS

| | | |
|---|---|---|
| 404,381 A | 6/1889 | Clark |
| 814,334 A | 3/1906 | Taliaferro |
| 2,937,757 A | 5/1960 | Pisani |
| 3,217,959 A | 11/1965 | Di Renzo |
| 3,893,657 A | 7/1975 | Sieurin .................... 266/37 |

(Continued)

FOREIGN PATENT DOCUMENTS

| | | |
|---|---|---|
| EP | 0 938 944 A2 | 9/1999 |
| FR | 2 404 468 | 4/1979 |
| GB | 852 738 A | 11/1960 |
| GB | 2 346 384 A | 8/2000 |
| JP | 63 080962 | 4/1988 |

(Continued)

OTHER PUBLICATIONS

International Search Report for PCT US 02/00665 mailed Dec. 19, 2002.

(Continued)

*Primary Examiner*—Jonathan Johnson
(74) *Attorney, Agent, or Firm*—Lowrie, Lando & Anastasi, LLP

(57) ABSTRACT

When dross is removed from a molten-solder reservoir, a substantial amount of molten solder is often removed with the dross. This molten solder can be separated from the dross and returned to reservoir via a conduit for reuse. Additionally, a skimmer for removing the dross from the reservoir includes a skimming plate pivotally attached to a displaceable structure; a stop is provided to restrict the degree to which the skimming plate can pivot so that the skimming plate will not pivot more than 90° from vertical to enable the skimming plate to dig into the dross and collect dross when the displaceable structure is displaced toward on outlet of the reservoir. Further still, the displaceable structure of the skimmer can be controlled via a computer control system storing software code instructions for a motor to extend and retract the displaceable structure such that the skimming plate extends to a position further from the outlet port of the reservoir with each displacement cycle.

27 Claims, 10 Drawing Sheets

U.S. PATENT DOCUMENTS

| | | | |
|---|---|---|---|
| 3,941,360 A | 3/1976 | Blank | 266/37 |
| 3,980,219 A | 9/1976 | Schmid | 228/34 |
| 4,057,232 A | 11/1977 | Ross et al. | 266/227 |
| 4,075,008 A | 2/1978 | Leonard | 75/86 |
| 4,191,559 A | 3/1980 | Van Linden et al. | |
| 4,220,318 A | 9/1980 | Anderson et al. | 266/49 |
| 4,286,985 A | 9/1981 | Van Linden et al. | 75/65 |
| 4,332,373 A | 6/1982 | Huppunen et al. | 266/228 |
| RE31,028 E | 9/1982 | Cromwell | 241/14 |
| 4,368,956 A | 1/1983 | Yamada et al. | 350/432 |
| 4,394,978 A | 7/1983 | Weiss | 241/23 |
| 4,509,670 A | 4/1985 | Cammarata | 228/34 |
| 4,540,163 A | 9/1985 | van Linden | 266/201 |
| 4,610,391 A | 9/1986 | Nowotarski | 228/219 |
| 4,632,291 A | 12/1986 | Rahn et al. | 228/9 |
| 4,656,572 A | 4/1987 | Caputo et al. | 363/41 |
| 4,772,320 A | 9/1988 | van Linden et al. | 75/68 R |
| 4,802,617 A | 2/1989 | Deambrosio | 228/180.1 |
| 5,087,356 A | 2/1992 | Webb | 210/143 |
| 5,361,969 A | 11/1994 | Gileta | 228/180.1 |
| 5,755,889 A | 5/1998 | Johnson | 75/414 |
| 6,284,190 B1 | 9/2001 | van der Lugt et al. | 266/227 |
| 6,431,431 B2 | 8/2002 | Willis et al. | |
| 6,592,017 B2 * | 7/2003 | Morris et al. | 228/34 |
| 6,666,370 B2 * | 12/2003 | McDonald | 228/203 |
| 2002/0005376 A1 | 1/2002 | Tooyama et al. | 209/11 |
| 2002/0092897 A1 | 7/2002 | Morris et al. | |

FOREIGN PATENT DOCUMENTS

| | | |
|---|---|---|
| JP | 03 243731 | 10/1991 |
| JP | 08 092710 | 4/1996 |
| WO | WO 82/01895 | 10/1982 |
| WO | WO 84/03719 | 9/1984 |
| WO | WO 95/25823 | 9/1995 |
| WO | WO 00/02695 | 1/2000 |
| WO | WO 00/06781 | 2/2000 |
| WO | WO 02/062515 | 8/2002 |

OTHER PUBLICATIONS

International Search Report for PCT US 03/01562 mailed May 21, 2003.

International Search Report for PCT/US2002/00665 mailed Aug. 8, 2002.

International Search Report for PCT/US2004/016690 mailed Jan. 21, 2005.

* cited by examiner

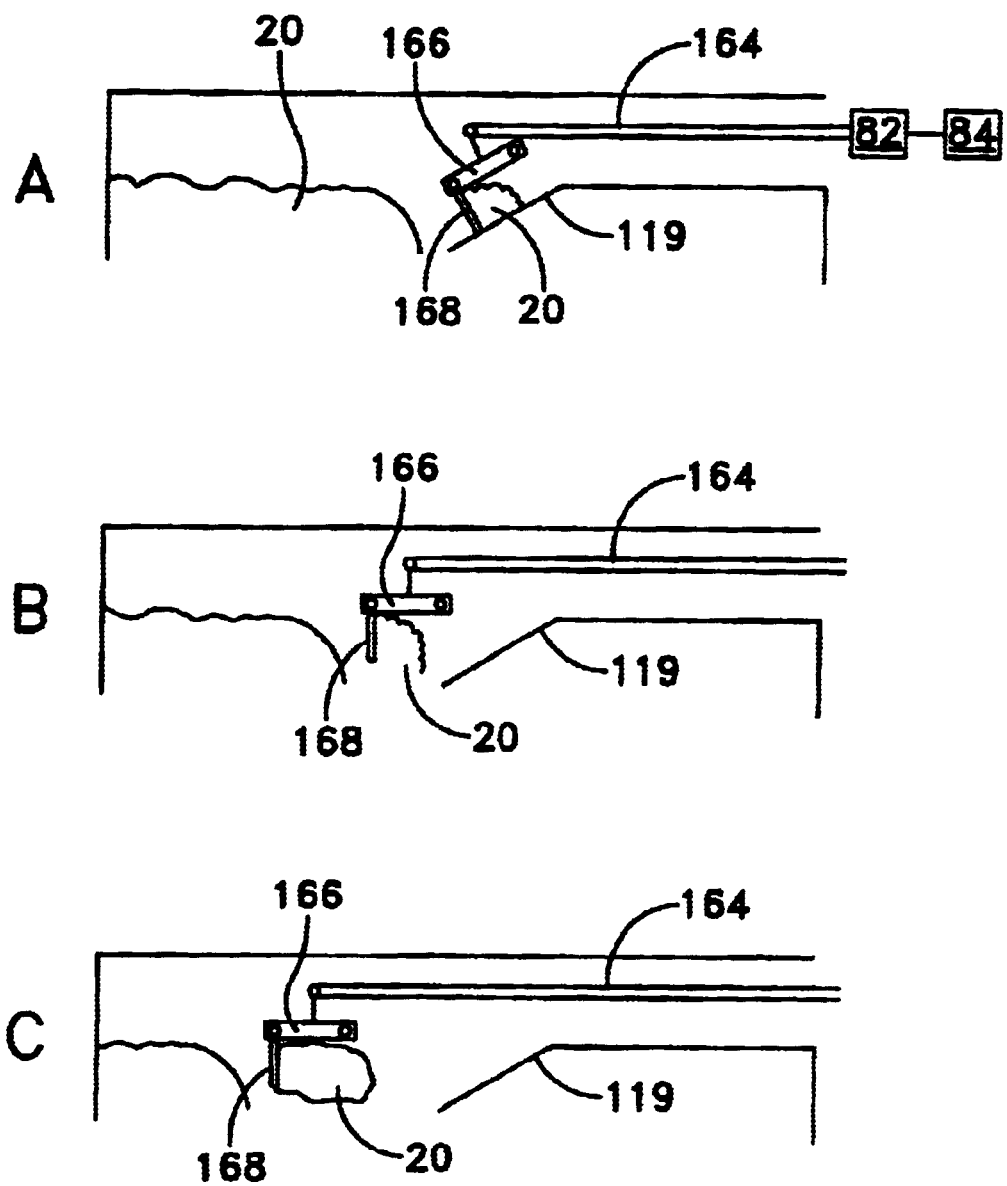
FIG. 15 A-C

DROSS REMOVAL AND SOLDER RECLAMATION IMPROVEMENTS

RELATED APPLICATIONS

This application is a continuation-in-part of U.S. Ser. No. 09/759,506, filed Jan. 12, 2001 U.S. Pat. No. 6,592,017, the entire disclosure of which is incorporated herein by reference. This application is also a continuation-in-part of U.S. Ser. No. 10/051,407, filed Jan. 18, 2002 U.S. Pat. No. 6,666,370, the entire disclosure of which is incorporated herein by reference.

BACKGROUND

When many molten metals contact air, compounds of those metals, primarily oxides but also nitrides and other non-metallic impurities, can be formed. When the molten metal is moving, the metal and the metal oxide combine to form a material known as dross. The dross often forms a sponge-like network and has a lumpy, granular appearance.

In a wave soldering device, such as that described in U.S. Pat. No. 6,431,431 B2, the disclosure of which is incorporated by reference herein in its entirety, the dross floats on the surface of a molten solder bath. The molten solder is pumped through a nozzle to form a wave. Substrates, such as printed wiring boards, are then passed over and into contact with the wave to deposit solder on the substrate surface. If the dross is allowed to build up, the dross can become entrained in the solder wave and adversely affect the quality of soldering Accordingly, the dross is periodically removed from the solder reservoir to prevent contamination of the solder. Existing methods of dross removal also often remove a substantial amount of usable molten solder along with the dross. It is estimated that dross removed from the surface of a molten solder bath can included 30–90% usable solder that can be reclaimed for reuse.

Where molten solder has been separated from the dross after removal from the solder reservoir, the molten solder is cooled to form a brick. The brick is then returned to the solder reservoir, where the heat of the molten-solder reservoir re-melts the brick so that the solder is again usable for application to a printed wiring board.

SUMMARY

Disclosed herein are apparatus and methods for (a) removing dross from a molten-solder reservoir, wherein an amount of molten solder is removed with the dross; (b) separating the molten solder from the removed dross; and (c) returning the separated molten solder to the molten-solder reservoir via a conduit. The reservoir, separation device and return conduit can all be positioned adjacent one another. These apparatus and methods provide a highly efficient means of recycling the molten solder that was trapped with the dross without solidifying the solder at any point during this process.

Also disclosed is a skimmer for removing the dross from the reservoir. The skimmer includes a skimming plate pivotally attached to a displaceable structure, such as a trolley mounted in a track. A stop is provided to restrict the degree to which the skimming plate can pivot so that the skimming plate will not pivot more than 90° from vertical. Accordingly, the stop positions the skimming plate so that it will dig into and collect dross when the displaceable structure is displaced toward on outlet of the reservoir. This configuration enables frequent and repeated reciprocation of the skimmer while preventing the skimming plate from floating horizontally atop the dross when the skimmer is displaced toward the outlet of the reservoir.

Further still, the displaceable structure of the skimmer can be controlled via a computer control system storing software code instructions for a motor to reciprocally displace the displaceable structure such that the skimming plate extends to a position progressively further from the outlet port of the reservoir with each displacement cycle. This approach offers a manageable, incremental procedure for removing dross without overloading the skimmer.

BRIEF DESCRIPTION OF THE DRAWINGS

In the accompanying drawings, described below, like reference characters refer to the same or similar parts throughout the different views. The drawings are not necessarily to scale, emphasis instead being placed upon illustrating particular principles of the methods and apparatus characterized in the Detailed Description.

FIGS. 15A, 15B and 15C illustrate sequential passes of the skimmer of FIGS. 13 and 14 over the molten solder bath, the skimming plate extending incrementally further across the bath with each pass.

DETAILED DESCRIPTION

Figure 1:
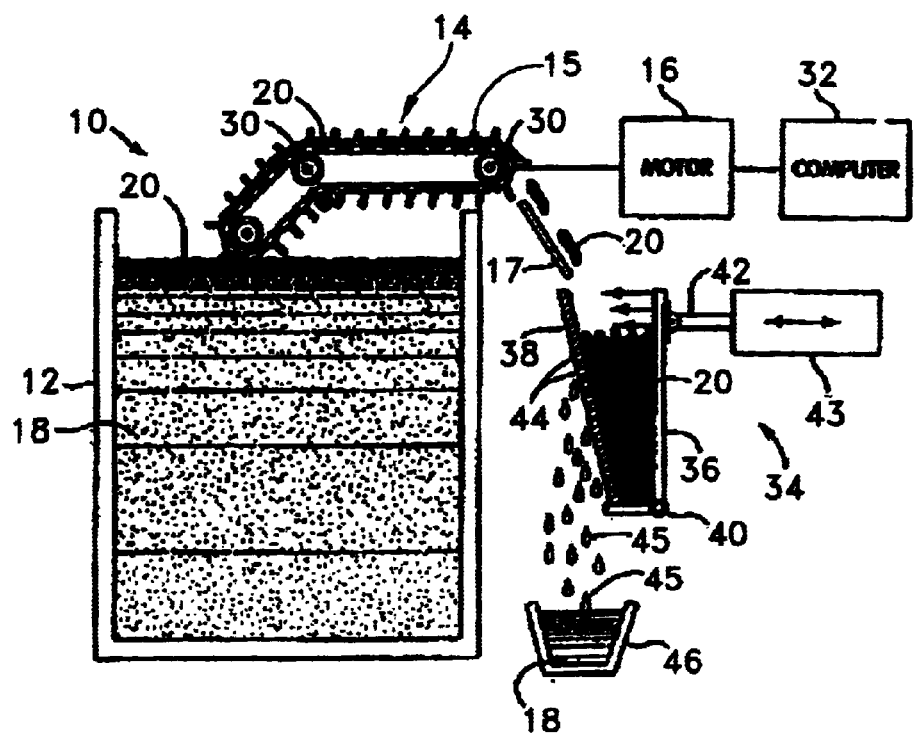
FIG. 1 is a cross sectional side view of one embodiment of an automatic dross removal apparatus in accordance with the invention.

FIG. 1 shows an embodiment of the automatic dross removal apparatus 10. The apparatus 10 includes a solder reservoir 12 and a conveyor 14 that is driven by a motor 16.

The reservoir 12 contains liquid solder 18, which has dross 20 forming on its top surface. A dross removal mechanism, such as a conveyor 14, has one end protruding into the solder reservoir 12 to skim the dross 20 from the surface of the solder 18 and carry it out of the reservoir 12. The conveyor 14 is driven by a motor 16 that drives a sprocket 30 that engages and drives the endless belt or chain of the conveyor 14 for removing the dross 20 from the reservoir 12. The conveyor 14 can have one or more brackets 15, such as an angle bracket and can be adjustably positioned (e.g., raised or lowered) to allow the brackets 15 to sweep across the top surface or beneath the surface of the liquid solder 18. When power is supplied to the motor 16, the conveyor 14 draws the angled bracket 14 forward, dragging the dross 20 on the conveyor 14 and over the edge of the solder reservoir 12. The conveyor motor 16 is preferably driven by a computer 32 such that the dross removal apparatus 10 can operate automatically with or without operator intervention. Alternatively, the conveyor motor 16 can be controlled by a switch (not shown). Preferably, the conveyor motor 16 is computer controlled through timers with conventional overload protection for the device.

Figure 2:
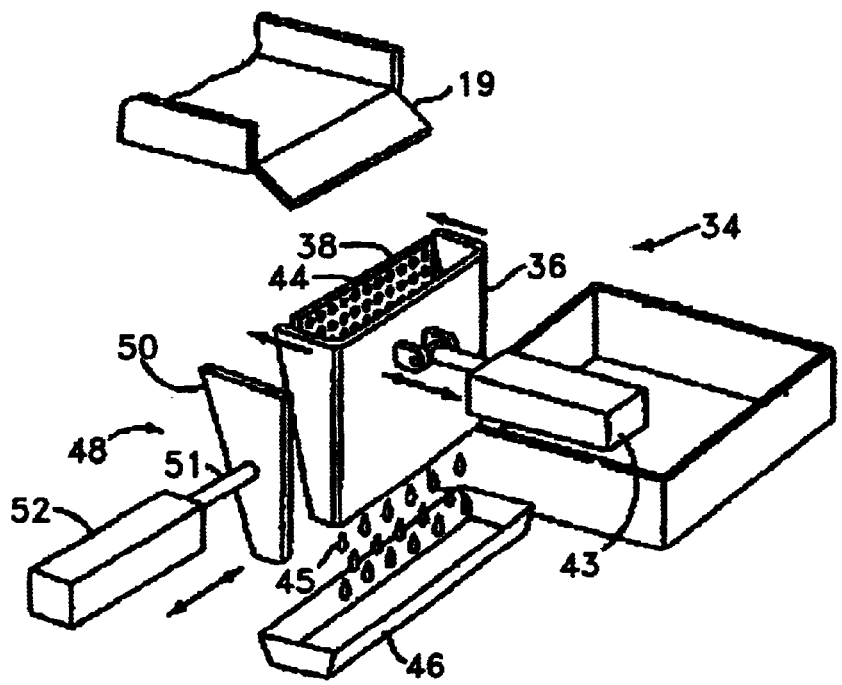
FIG. 2 is a front isometric view of a dross reclamation device used in conjunction with the automatic dross removal apparatus of FIG. 1.

The conveyor 14 or other dross removal mechanism removes the dross from the solder reservoir, sends it over chute 17 and deposits it into a container or a dross separation device 34 for further processing. One embodiment of the dross separation device 34, which is shown in FIGS. 1 and 2, includes a first portion 36 and a second portion 38. The first and second portions 36 and 38 are movable in relation to one another such that the dross 20 recovered from the solder reservoir 12 can be compressed to remove any usable molten solder. For example, the first portion 36 of device 34 can include a pivot 40 or hinge and be connected to a piston 42 or cylinder that is driven by a motor 43. The second portion 38 can include holes 44 of an appropriate size such that molten solder drops 45 flow through the holes and drop into a receptacle 46.

As shown in FIG. 2, the dross separation device 34 can include an ejection device 48 that can include, for example, a plate 50 for ejecting the solder depleted dross, and a piston 51 or cylinder that is driven by a motor 52. The ejection device 48 can eject dross by moving the plate 50 outwardly against the dross separation device 34 after the first portion 36 is opened such that the first portion 36 is pivoted outwardly from the second portion 38. A conveyor chute 19 for depositing the dross into the dross separation device 34 can also be provided.

Figure 3:
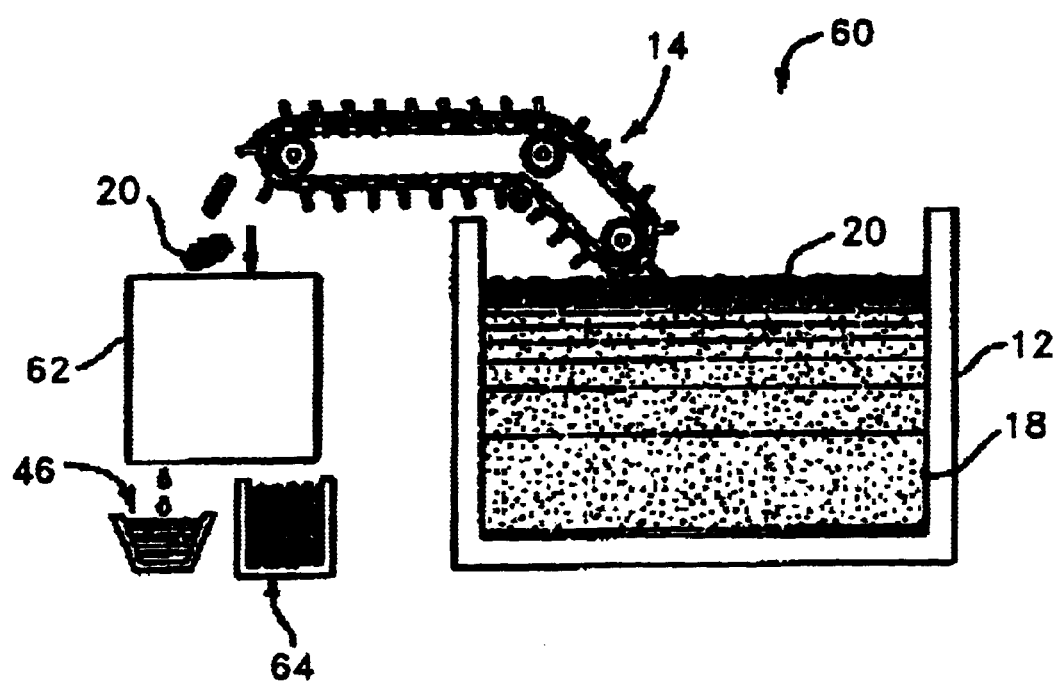
FIG. 3 is a cross sectional side view of another dross reclamation device used in conjunction with the automatic dross removal apparatus of FIG. 1.

FIG. 3 shows an embodiment of the automatic dross removal apparatus 60 that uses a dross separation device 62, which separates the dross into receptacle 64 and reusable solder into receptacle 46. The dross separation device 62 can be a device such as the dross muncher manufactured by the company, Solet, located in the United Kingdom. FIGS. 4–7 show a second embodiment of the automatic dross removal apparatus 70, wherein the reservoir 72 is partially cut-away and the molten solder is made transparent to show elements of the pumping apparatus. The apparatus 70 has a solder reservoir 72 and a dross skimmer 74 having a skimming plate 77 protruding into the reservoir 72 for moving or pushing the dross within its pathway. The apparatus 70 also has means for moving the dross within the reservoir towards the skimmer assembly 94, such as one or more pumps 76 and pressure nozzles 78 (see FIG. 7), wherein the pumps 76 pump solder and dross through channels 83 and then out through the nozzles 78 (see FIG. 7) above the bath surface. The solder flows out of the nozzles 78 in one direction within channels 81 flushing any dross with it, toward the skimmer apparatus 94, which removes the dross. A gas, such as nitrogen, that is inert with solder can be used to pressurize the nozzle to remove and/or limit oxygen to further reduce dross formation.

Figure 4:
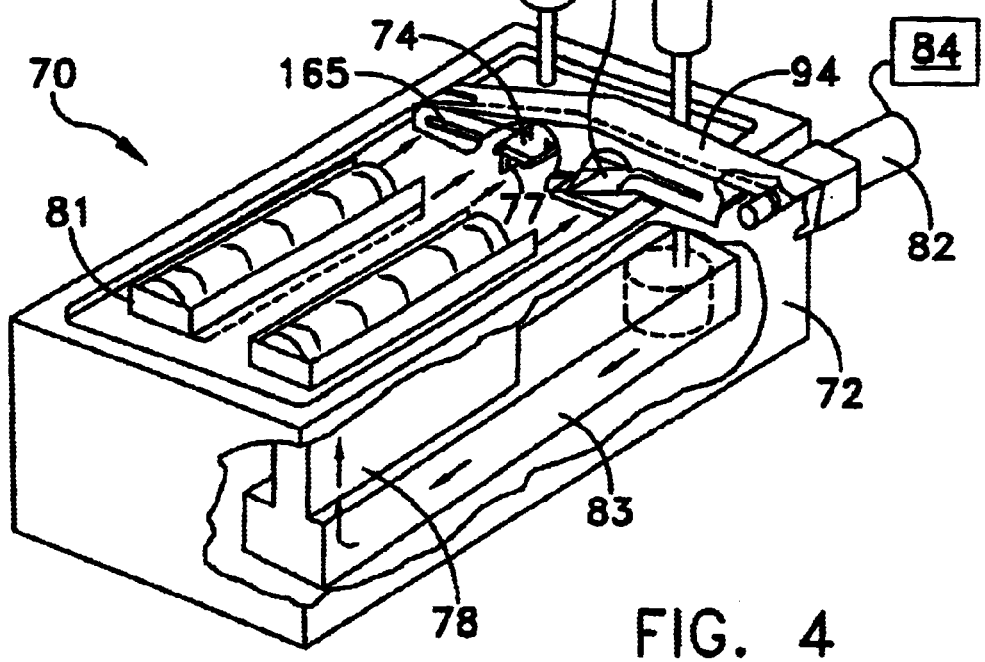
FIG. 4 is a perspective view of another embodiment of an automatic dross removal apparatus in accordance with the invention.
Figure 6:
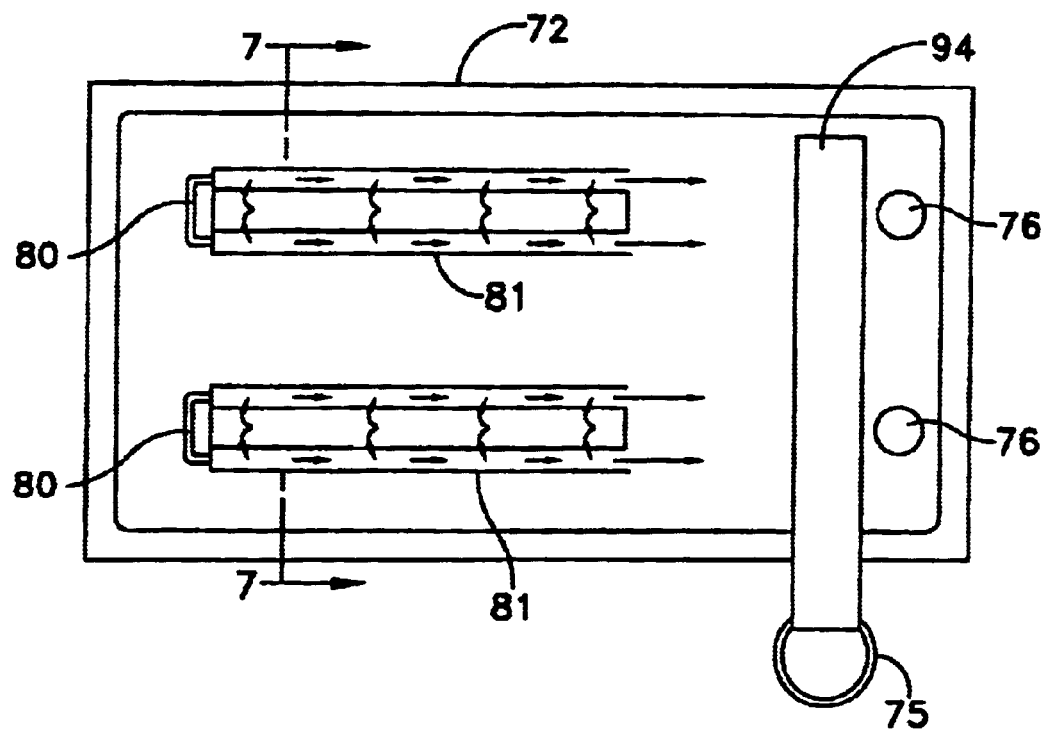
FIG. 6 is a top view of the automatic dross removal apparatus of FIG. 4.
Figure 7:
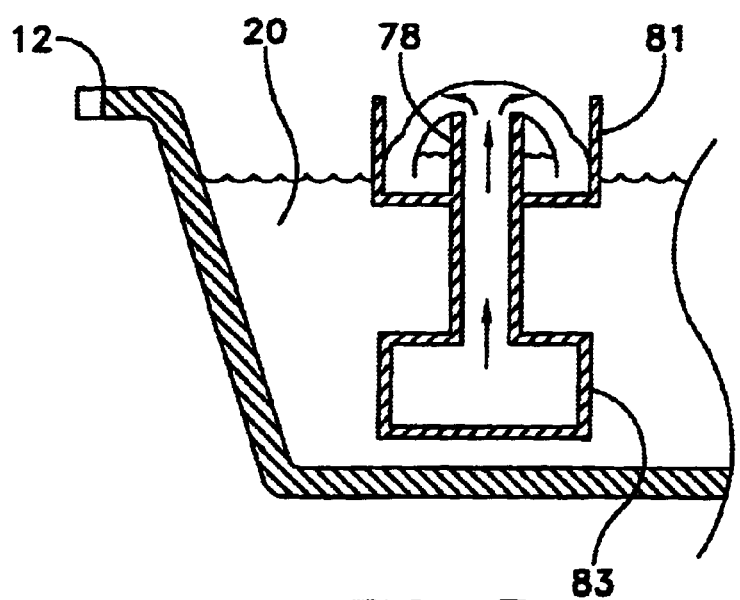
FIG. 7 is a sectioned side view of the dross removal apparatus illustrated in FIGS. 4 and 6.

Like the dross removal apparatus 10 of FIG. 1, the dross removal apparatus 70 of FIG. 4 can be driven by a motor 82 (in this case, a rotary motor) for automatically moving the skimmer 74 to place the dross in a receptacle 75. The motor 82 is preferably driven by a computer 84 such that the dross removal apparatus 70 can operate automatically with or without operator intervention. Alternatively, the motor 82 can be controlled by a switch. Preferably, the motor 82 is computer controlled via timers with overload protection for the device.

Figure 5:
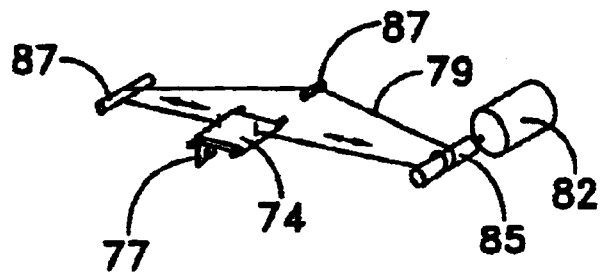
FIG. 5 illustrates the drive mechanism for displacing the skimmer in FIG. 4.

As FIG. 5 illustrates, the rotary motor 82 reciprocally drives a cable 79 back and forth via a pulley 85 over rollers 87. The skimmer 74, which has a pivotally mounted skimming plate 77, is mounted to the cable 79 to reciprocate back and forth as the cable 79 is reciprocally displaced. As the skimmer 74 is drawn toward the motor 82, the skimmer 74 is pulled across the molten solder at, near, or into the top surface of the molten solder and up a ramp 119 along a track 165 that positions the skimming plate 77 in contact with the ramp 119 (see FIG. 4) to or beyond the edge of the reservoir 72 so as to expel the dross that is captured by the skimmer 74 from the reservoir 72.

Figure 8:
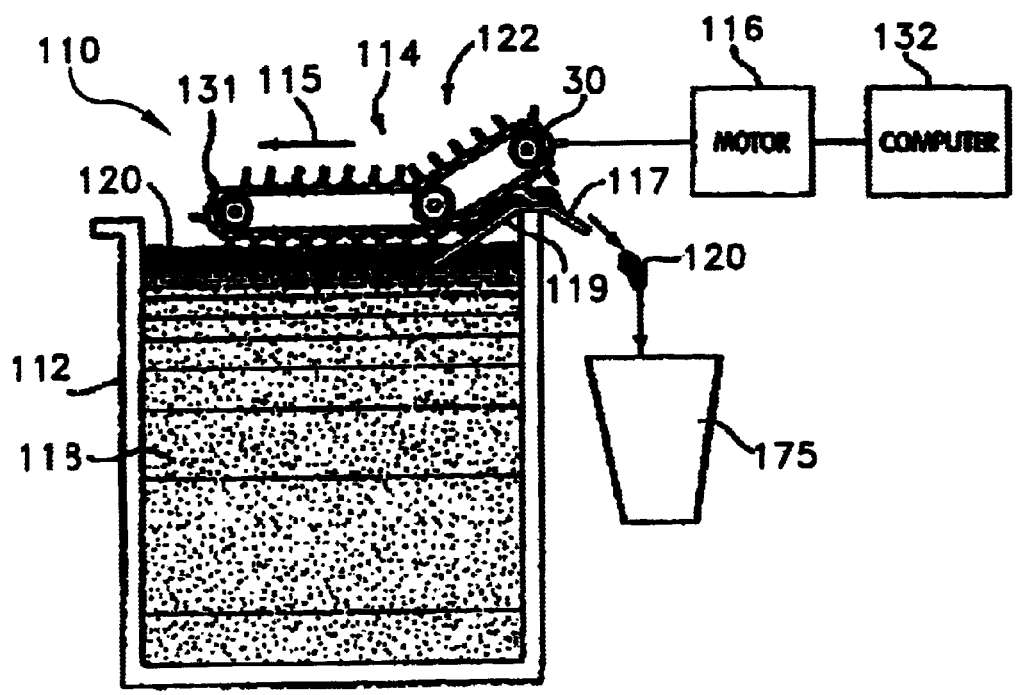
FIG. 8 is a cross sectional side view of yet another embodiment of an automatic dross removal apparatus in accordance with the invention.
Figure 9:
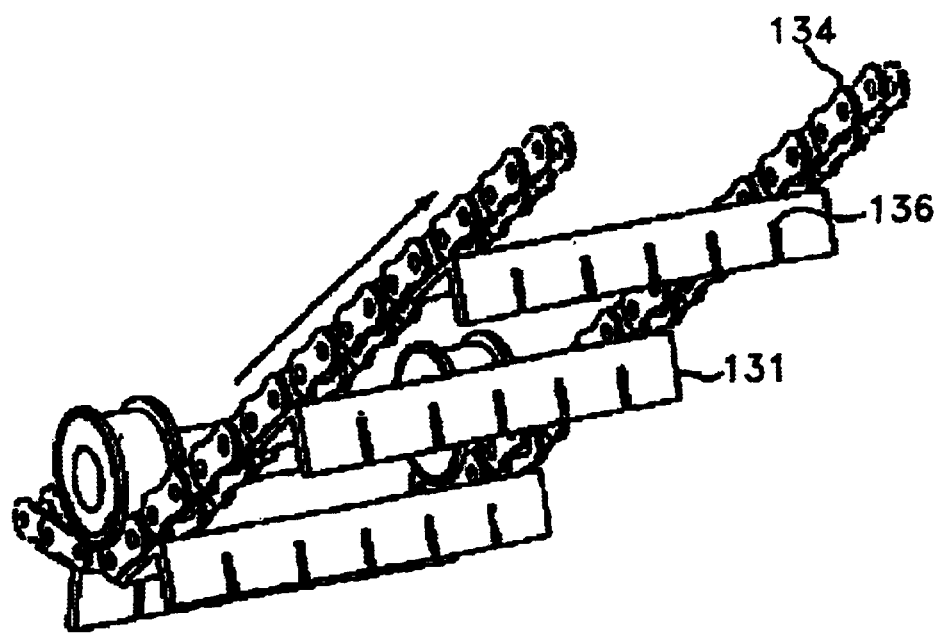
FIG. 9 is a front isometric view of the conveyor of the automatic dross removal apparatus of FIG. 8.

FIGS. 8 and 9 show a second embodiment of an automatic dross removal apparatus 110. The dross removal apparatus 110 is generally similar to the dross removal apparatus 10 of FIG. 1, with the exception that the conveyor 140 moves in a direction opposite to that of the conveyor 14 in a direction shown by arrow 115. As shown in FIG. 8 and best in FIG. 9, the conveyor 140 has two endless chains 134 that support a plurality of L-shaped brackets 131. The brackets 131 preferably have one or more slots 136 to allow liquid solder 118 to pass therethrough. The brackets 131 typically penetrate into molten solder 118, though the brackets 131 can still be used to remove dross 120 if they do not extend down to or into the molten solder 118, as illustrated in FIG. 8. The brackets 131 contact the ramp 119 as the brackets 131 are drawn up the ramp 119.

The dross removal apparatus 110 includes a solder reservoir 112 and a conveyor 114 that is driven by a motor 116. The reservoir 112 contains liquid solder 118 which has dross 120 forming on its top surface. A conveyor 122 has one end protruding into the solder reservoir 112 to skim the dross 120 from the surface of the solder 118, push it up the surface of ramp 119 and dump it into receptacle 175. Alternatively, the dross could be placed in a dross separation device, as shown in either FIG. 2 or 3. The conveyor 114 is driven by a motor 116 which drives a sprocket 130 that engages and drives the endless belt or chain of the conveyor. The conveyor can have one or more brackets 131, such as an angle bracket. When power is supplied to the motor 116, the conveyor 122 draws the angled bracket in the direction of arrow 115, and drags the dross 120 on the ramp 119 and over the edge of the solder reservoir 112. The conveyor motor 116 is preferably driven by a computer 132 (which is the same as or similar to computers 32, 84 and 158 in other FIGS.) such that the dross removal apparatus 110 can operate automatically with or without operator intervention. Alternatively, the conveyor motor 116 can be controlled by a switch. Preferably, the conveyor motor 116 is computer controlled through timers with overload protection for the device.

Figure 10:
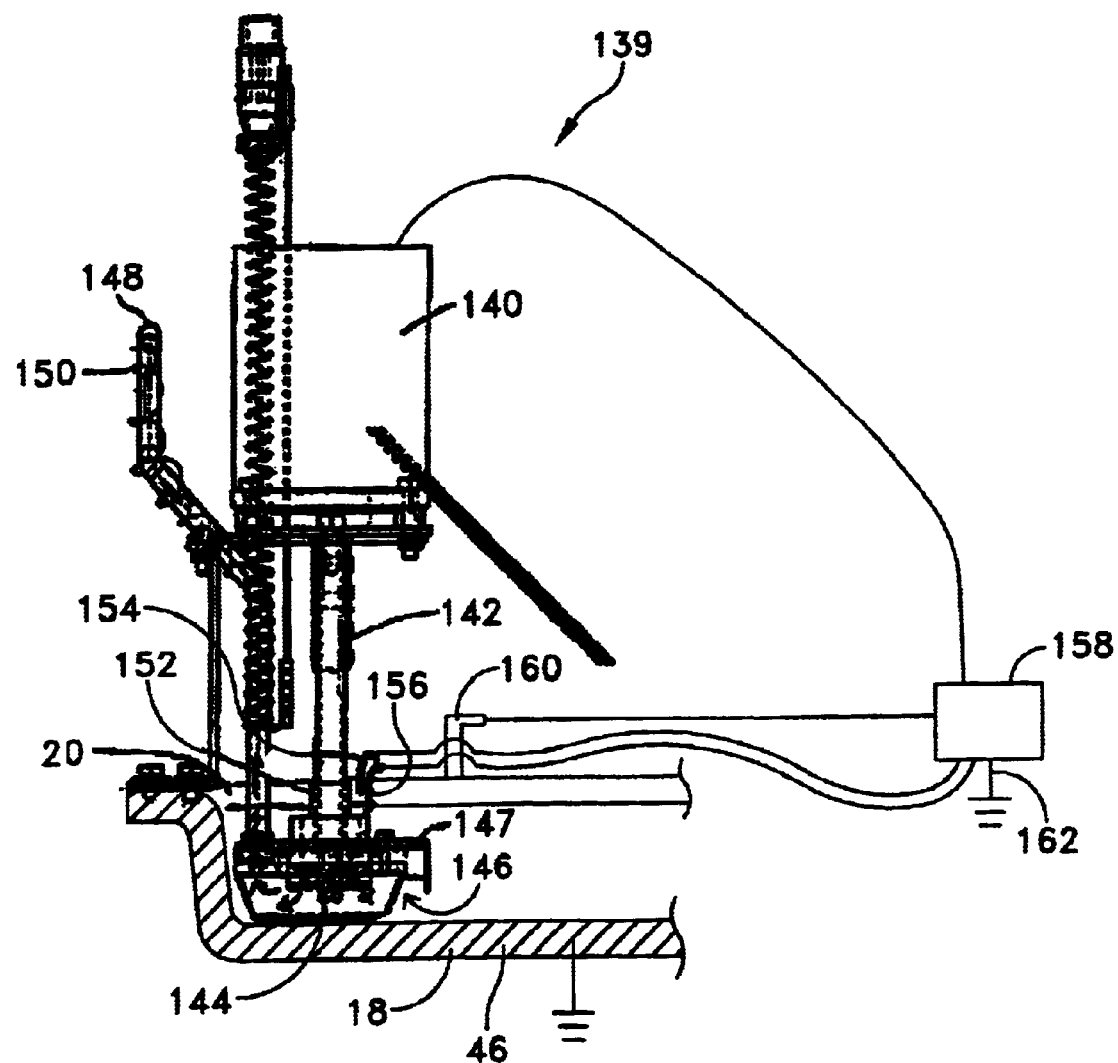
FIG. 10 is an illustration, partially sectioned, of a solder reclamation apparatus.

A solder reclamation receptacle 46 is illustrated in FIG. 10. The receptacle 46 contains solder 18 that has been separated from dross 20 by a dross separation device 34 (see FIG. 1) after the dross 20 is skimmed from a molten solder reservoir 12 (see FIG. 1). Other suitable embodiments of a dross separation device (also referred to as a solder-dross mixture separation apparatus) are described in U.S. Ser. No. 10/051,407, which is incorporated herein by reference in its entirety.

Figure 11:
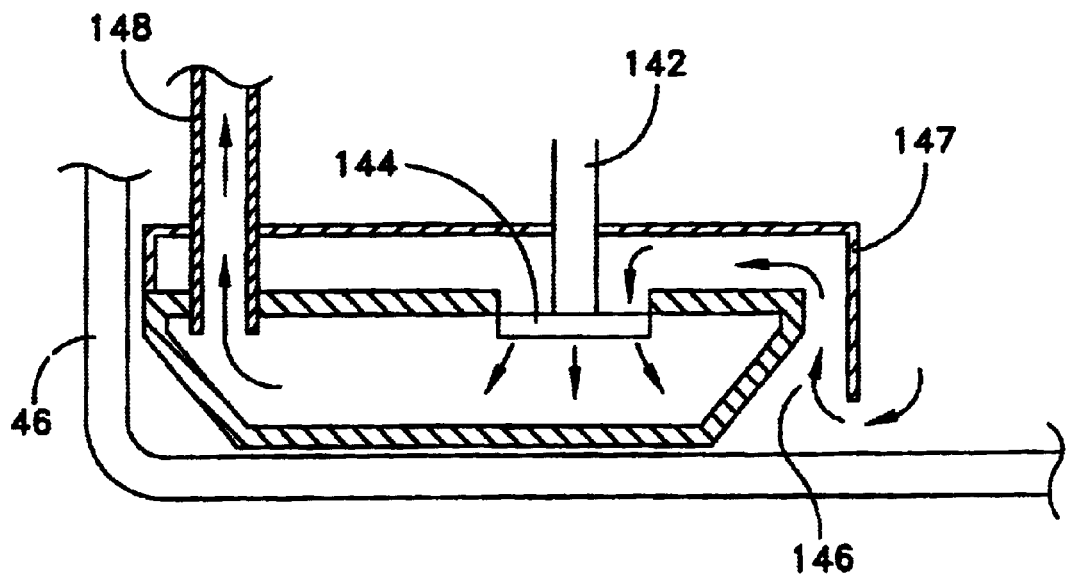
FIG. 11 is a cross-sectional illustration of the details of the impeller housing in the apparatus shown in FIG. 10.
Figure 12:
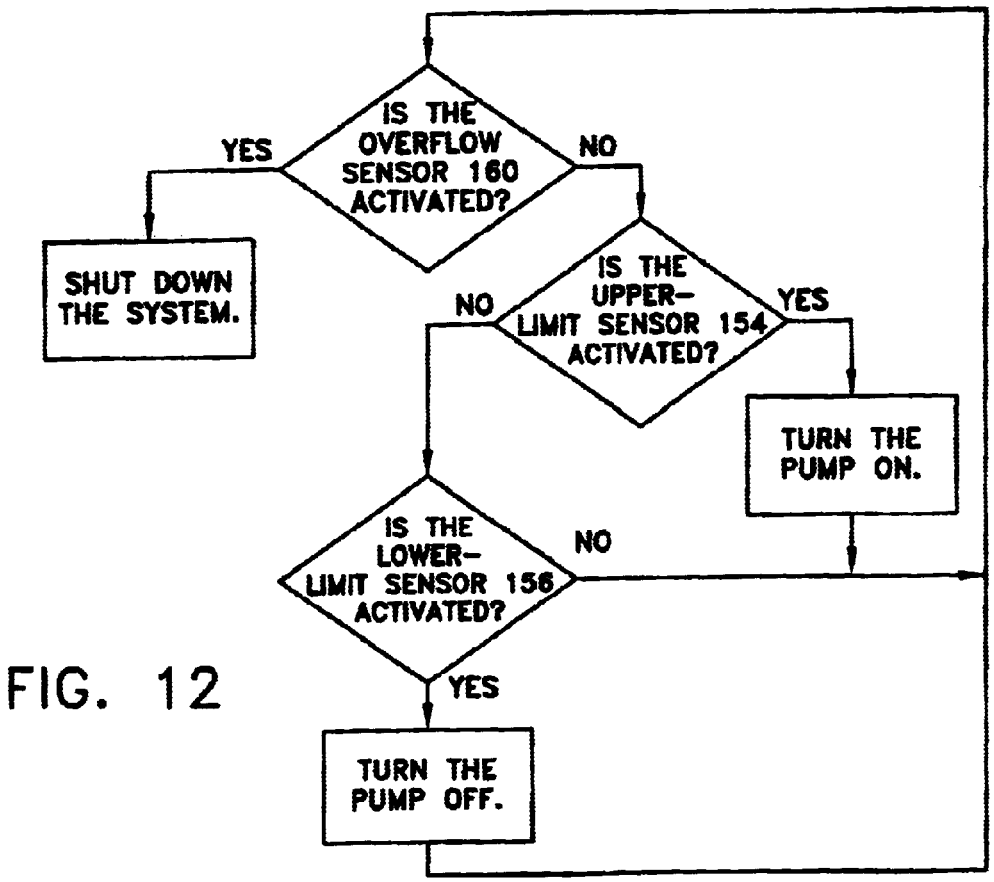
FIG. 12 is a flow chart illustrating the processing of signals from sensors for measuring the height of dross in the solder reclamation apparatus of FIG. 11 and the decision-making based thereon.

A solder return pump 139 driven by a motor 140 is placed in the solder reclamation receptacle 46. The pump 134 operates much like a water sump pump common in many residential basements; within the solder reclamation receptacle 46, the pump 139 draws molten solder from near the bottom of the receptacle 46. The pump motor 140 transmits a rotary force through a shaft 142 to an impeller 144 (illustrated in greater detail in FIG. 11), which draws the molten solder through a pump intake 146, through the pump housing 147, and into a solder return conduit 148, which channels the molten solder back to the molten solder reservoir. The solder return conduit 148 is heated by a heating element 150 to prevent the solder from cooling and solidifying within the conduit 148.

The solder level within the solder reclamation receptacle 46 gradually rises as more dross is skimmed from the molten solder reservoir and separated into dross and reclaimed solder components. The solder level in the receptacle 46 can be dropped by activating the pump 139 to reclaim molten solder 18 through the solder return conduit 148.

The solder return pump 139 includes a float 152 positioned about the pump shaft 142. The float 152 moves up and down with the level of the solder (or dross) in the solder reclamation receptacle 46. When the float 152 reaches a predetermined height, an upper-limit sensor 154 is activated. When activated, the upper-limit sensor 154 activates the pump motor 140, thereby beginning the transfer of solder 18 from the solder reclamation receptacle 46 to the main solder reservoir and lowering the level of the solder 18 in the solder reclamation receptacle 46.

A lower-limit sensor 156 senses the float 152 position at a lower level and sends an electronic signal turning off the pump motor 140 when the lower-limit sensor 156 detects the height of the float 152 to have dropped to a lower limit so as to prevent dross 20 at the surface from being drawn into the pump intake 146 along with the molten solder 18. Sensing can be performed by a pair of on/off-type sensors 154, 156 or by a continuously reading analog-type sensor through software control. The sensors 154, 156 can be fiber-optic sensors, and the float 152 can include a flag positioned to break the beam of the sensors 154, 156 when the float 152 is at the limit heights. In one embodiment, the sensors 154, 156 are Model OBT 200L-18GM70 E5-V1 fiber-optic sensors from Pepperl+Fuchs, Inc. (Twinsburg, Ohio, USA), and the sensors 154, 156 are coupled with the computer 158 via Model LMR 18-2, 3-0, 5-K 11 cables from Pepperl+Fuchs, Inc.

The software control is provided via a computer 158 coupled with the sensors 154, 156 and with the motor 140. The computer 158 is thereby able to receive measurements from the sensors 154, 156, process those measurements utilizing software code stored on a computer-readable storage medium, and generate instructions, which are communicated to the motor 140 to commence or stop pumping based on the measurements received from the sensors 154, 156. The computer is a standard personal computer (e.g., a PENTIUM-based desktop computer running a WINDOWS operating system).

If for any reason the upper-limit sensor 154 does not sense the float 152 when the float 152 is in its up position, the solder 18 would eventually overflow from the solder reclamation receptacle 46 absent another fail-safe mechanism. Such a mechanism is provided in the form of an additional independent overflow sensor 160 used to provide a high-level shut off in the solder reclamation receptacle 46. The overflow sensor 160 is a metallic strip that is normally electrically isolated from the reclamation receptacle 46, but that has a DC potential between the sensor 160 and the molten solder 18 to ground and is mounted such that it will touch the molten solder 18 just prior to the solder 18 overflowing the reclamation receptacle 46, thereby creating an electrical connection between the overflow sensor 160 and the ground 162. A computer system 158 in communication with the overflow sensor 160 senses the voltage connection and causes the entire system to be stopped, thereby preventing the solder 18 from spilling from the solder reclamation receptacle 46.

Within the solder reclamation receptacle 46, a thin layer of dross 20 will typically form on the surface of the solder 18 due to interaction between the solder and oxygen in the air. Additionally, some of the dross 20 from the dross separation device 34 (see FIG. 1) will find its way into the solder reclamation receptacle 46. This dross 20 tends to collect in the upper part of the receptacle 46. Accordingly, when pumping reclaimed solder, particular embodiments, such as that illustrated in FIG. 11, position the pump intake 146 located as low as is practical in the solder reclamation receptacle 46 so as to reduce the likelihood of entraining dross particles in the reclaimed solder that is being returned to the main solder reservoir, which is coupled with the nozzle that generates a wave of molten solder in a wave soldering device.

The melting points of solders typically range from 183° C. (361° F.) for 63/37 Sn/Pb electronic solder to close to 260° C. (500° F.) for a variety of lead-free solders that are growing in popularity. To ensure the flowability of the solder in the conduit 148, the solder 18 should be maintained at a temperature above its melting point throughout the system. The temperature of the solder 18 can be maintained by heating the conduit 148 along its entire path with a heat-tape-type heating element 150 wrapped around the conduit.

In one embodiment, the heating element 150 is in the form of a heat tape and is designed (dimensions, resistivity, etc.) to maintain the solder return conduit 148 at a constant temperature. Constant temperature can be maintained via a closed-loop thermocouple control system, where a thermocouple monitors the temperature of the conduit and communicates with the computer 158 to raise or lower the wattage of the heating element 150 to maintain the desired temperature. Alternatively, heat tape can be sized to the proper watt density, thereby eliminating the costs of a thermocouple closed loop control system.

Figure 13:
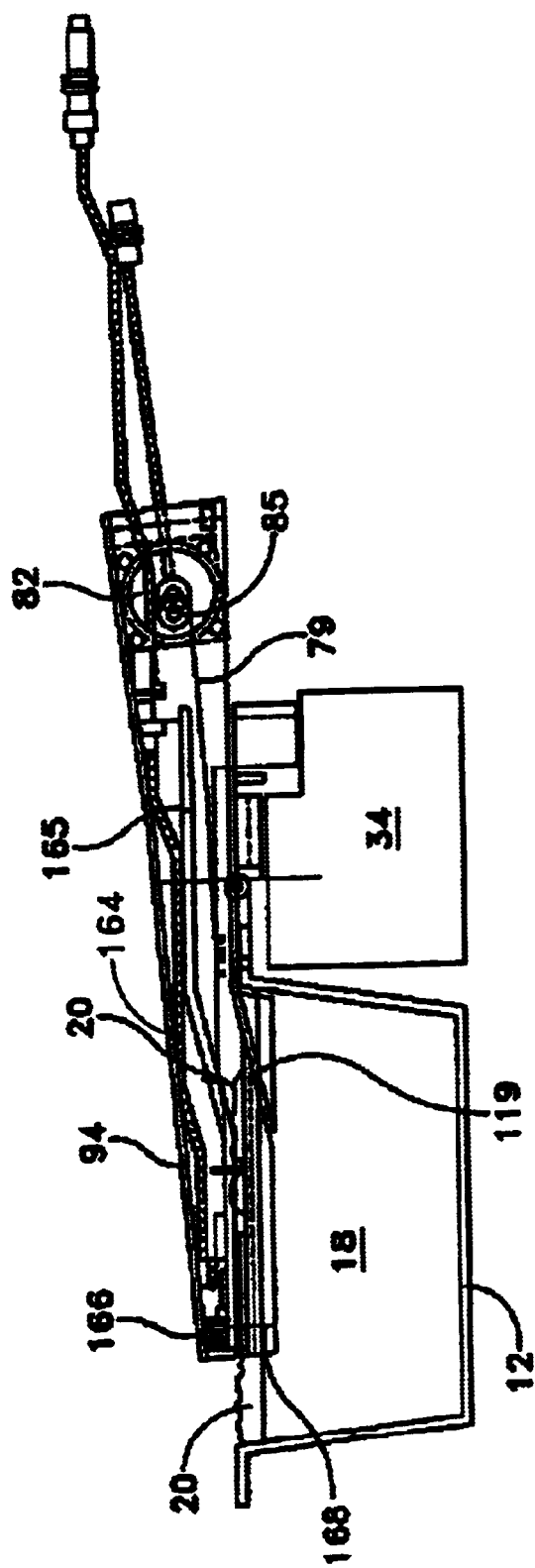
FIG. 13 is a view of a skimmer mounted on a reservoir filled with molten solder.

An additional embodiment of a skimmer assembly 94 is illustrated in FIG. 13, which can likewise be used in the apparatus of FIG. 4. The skimmer assembly 94 is mounted to a lip of the molten solder reservoir 12, and it includes a reciprocating structure including a skimmer cartridge 166 and skimming plate 168. In this embodiment, the skimmer cartridge 166 takes the form of a trolley mounted in a track 165 that extends across the reservoir 12. The skimming plate 168 skimming plate is made of a heat-resistant material that will not melt or deform when heated to the temperature of the molten solder and is pivotally mounted to the skimmer cartridge 166. The skimmer cartridge 166 can be mounted to displacement mechanism including a motor 82 and pulley 85, a cable 79 drive train, and a retractable arm 164, wherein the cable 79 is secured to the motor-driven pulley 85 at one end and to a remote end of the arm 164 at or proximate the skimmer cartridge 166 at the other end; the motor rotates the pulley 85 in either direction to collect or release the cable 79, thereby extending or retracting the arm 164.

Figure 14:
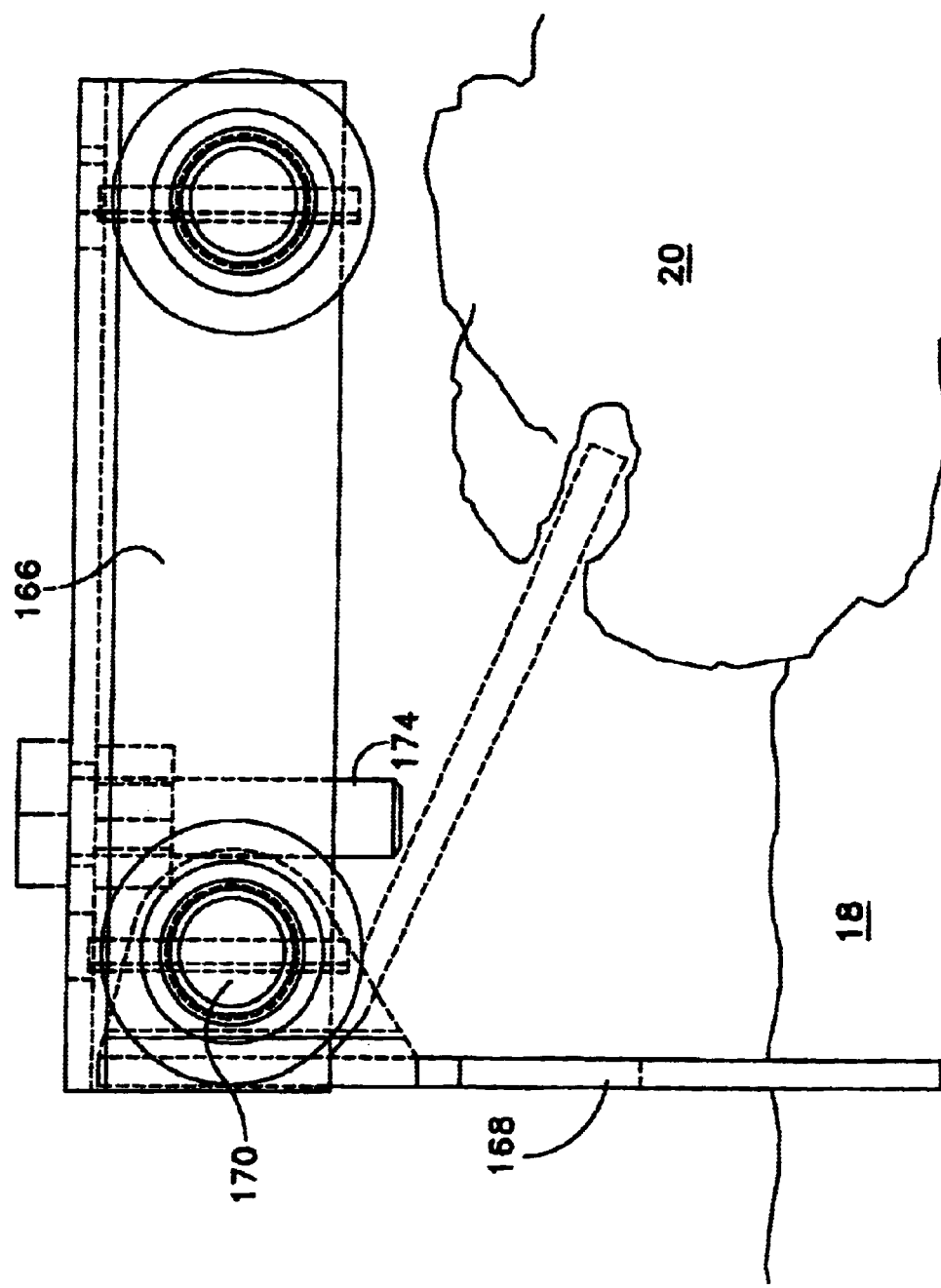
FIG. 14 is a magnified side view of the skimming plate and carriage of the skimmer illustrated in FIG. 13.

Operation of the skimmer is further illustrated in FIGS. 14 and 15A–C. As can be seen in FIG. 14, the skimming plate 168 is pivotally mounted to the skimmer cartridge 166 via a hinge 170 that permits the skimming plate 168 to extend orthogonally to or into the molten solder 18 in the reservoir 12. At the other extreme, the skimming plate 168 can be collapsed to a position near, but not quite, parallel with the surface of the molten solder bath 18, and the layer of dross formed thereon.

As shown in FIG. 13, when the arm 164 is retracted from a remote position, which may or may not be fully extended, the skimming plate 168 digs into the dross 20 and pivots about the hinge 170 to achieve an orientation normal to the top surface of the molten solder bath 18. The skimming plate 168 is mechanically constricted from further pivoting so as to prevent formation of a substantially acute angle between the skimming plate 168 and bath surface that would allow dross 20 to be dragged under the skimming plate 168, into the molten solder 18 only to reemerge on the opposite side.

As the skimmer cartridge 166 is retracted toward an outlet ramp 119, the skimming plate 168 collects dross 20 floating on the molten solder 18 between the skimming plate 168 and ramp 119. The skimming plate 168 scoops the collected dross 20 up the ramp 119 (as shown in FIG. 15A) and out of the reservoir 12 to a dross separation device. As the skimmer cartridge 166 is again extended to a position remote from the outlet, the skimming plate 168 pivots about the hinge 170 in the opposite direction so that the skimming plate 168 skims over the top surface of the dross 20 without substantially displacing the dross 20. A stop 174 extends from the skimmer cartridge 166 to provide a physical barrier against which the skimmer plate 168 collapses to prevent the skimming plate 168 from collapsing to a position parallel to the surface of the molten solder bath 18. If the skimming plate 168 were to collapse to this parallel position, the skimming plate 168 may not be able to dig into the dross 20 and rotate to its downward extended position to collect the dross 20 when the skimmer cartridge 166 is again retracted toward the outlet. The stop 170 can be in the form of a screw.

If a substantial quantity of dross 20 accumulates on the molten solder bath, as shown in FIGS. 15A–C, the skimmer cartridge 166 can be controlled via a computer 84 and a motor 82 to extend the skimmer cartridge 166 and plate 168 across the reservoir to progressively greater distances from the outlet with each reciprocal pass. Accordingly, the skimmer cartridge 166 may be only minimally extended across the reservoir on a first pass, as shown in FIG. 15A, to collect only a small section of the dross 20 proximate the outlet ramp 119 so that the skimmer is not overloaded. With each progressive pass of the arm 164 across the molten solder bath (see FIGS. 15B and 15C), the cartridge 166 and plate 168 extend to a further reach from the ramp 119 to reach a section of the dross 20 that was not skimmed on the previous pass. The cartridge 166 can be displaceably mounted in a track 165, as illustrated in FIG. 13, which guides the positioning of the cartridge 166 along the path.

The computer 84 includes a processor in communication with a computer-readable storage medium storing software code for communicating with the motor 82 coupled with the arm 164 to displace the arm 164 along its longitudinal axis, as described above. The software code includes a sequence of instructions to control the motor 82 and extend and retract the arm 164 (including the skimming plate 168) by a distance, for example, x, on a first pass and then to extend and retract the arm 164 by a distance, x+y, on a second pass. For a third pass, the software instructions can cause the motor to extend and retract the arm 164 by a distance, for example, x+2y, and so on until the pass extends the arm 164 substantially across the width of the bath.

The various elements described and illustrated in various embodiments, described above, can readily be interchanged. For example the trolley and track in the embodiment of FIG. 13 can readily be used in place of the arm in FIG. 15; moreover, other illustrated skimmers and conveyors can readily be interchanged in different embodiments.

While this invention has been shown and described with references to particular embodiments thereof, those skilled in the art will understand that various changes in form and details may be made therein without departing from the scope of the invention, which is limited only by the following claims.

What is claimed is:

1. A dross removal and solder reclamation apparatus comprising:
   a molten-solder reservoir suitable for containing molten solder;
   an automatic dross-removal mechanism mounted so as to be extendable into the molten-solder reservoir and designed to remove dross from the molten-solder reservoir;
   a dross-separation device designed to separate molten solder from dross and positioned to receive dross removed by the automatic dross-removal mechanism from the molten-solder reservoir;
   a solder-reclamation receptacle suitable for containing molten solder and positioned to receive molten solder separated by the dross-separation device; and
   a conduit coupled with the solder-reclamation receptacle and with the molten-solder reservoir to provide a pathway via which molten solder can be transported from the solder-reclamation receptacle back to the molten-solder reservoir.

2. The dross removal and solder reclamation apparatus of claim 1, further comprising a nozzle coupled with the molten-solder reservoir for generating a solder wave.

3. The dross removal and solder reclamation apparatus of claim 1, wherein the solder-reclamation receptacle defines a cavity having a top end, into which dross that is removed by the automatic dross-removal mechanism can be fed, and a bottom end remote from the top end, the conduit being coupled with the solder-reclamation receptacle at or proximate to the bottom end of the cavity.

4. The dross removal and solder reclamation apparatus of claim 1, wherein a heating element is coupled with the conduit to heat the length of the conduit and maintain solder in a molten state within the conduit.

5. The dross removal and solder reclamation apparatus of claim 4, wherein the heater is in the form of a heat tape element.

6. The dross removal and solder reclamation apparatus of claim 5, wherein the heat tape element is sized to maintain the conduit at a constant temperature of at least about 260° C.

7. The dross removal and solder reclamation apparatus of claim 5, further comprising a closed-loop thermocouple control system coupled with the heat tape element.

8. The dross removal and solder reclamation apparatus of claim 1, further comprising at least one sensor for measuring the height of dross and solder in the solder-reclamation receptacle.

9. The dross removal and solder reclamation apparatus of claim 8, wherein the sensor includes a float displaceably mounted within the cavity of the solder-reclamation receptacle to rise and fall with the height of molten solder in the solder-reclamation receptacle.

10. The dross removal and solder reclamation apparatus of claim 8, further comprising:
a pump positioned and configured to pump molten solder from the solder-reclamation receptacle through the conduit; and
an electronic controller coupled with the sensor and programmed to activate the pump to start pumping molten solder if the sensor detects the height of molten solder within the cavity as being above an upper trigger limit and to de-activate the pump to stop pumping molten solder if the sensor detects the height of molten solder as being below a lower trigger limit.

11. A method for dross removal and solder reclamation, the method comprising:
directing molten solder from a molten-solder reservoir through a nozzle against a printed wiring board;
removing dross formed on the molten solder in the molten-solder reservoir from the molten-solder reservoir and separating molten solder from the dross removed from the molten-solder reservoir;
collecting the separated molten solder in a solder reclamation receptacle; and
returning molten solder that was collected in the solder-reclamation receptacle back to the molten-solder reservoir via a conduit from the solder-reclamation receptacle.

12. The method of claim 11, wherein the molten solder is returned to the molten-solder reservoir in a molten form.

13. The method of claim 12, further comprising heating the conduit to maintain the solder in molten form.

14. The method of claim 13, wherein the conduit is heated to at least about 260° C.

15. The method of claim 12, wherein the conduit removes the molten solder from a position at or proximate to the bottom of the cavity for its return to the molten-solder reservoir.

16. The method of claim 12, further comprising monitoring the height of solder within the cavity of the solder-reclamation receptacle.

17. The method of claim 16, further comprising activating a pump to pump the molten solder through the conduit when the height of dross and solder within the cavity exceeds an upper trigger limit.

18. The method of claim 17, further comprising de-activating the pump to stop pumping the molten solder when the height of dross and solder drops below a lower trigger limit.

19. A skimmer for removing dross from a reservoir containing molten solder, the skimmer comprising:
a displaceable structure mounted to a displacement mechanism;
a skimming plate that is suitable for capturing dross floating on a bath of molten metal when the displaceable structure is displaced, the skimming plate being pivotally secured to the displaceable structure; and
a stop positioned to restrict the range of rotational displacement of the skimming plate to less than 90°.

20. The skimmer of claim 15, wherein the displaceable structure is a trolley mounted in a track, and wherein the displacement mechanism is coupled with the trolley to displace the trolley along the track.

21. A soldering apparatus comprising:
a reservoir defining a cavity for containing molten solder;
a displaceable structure mounted for reciprocal displacement across the cavity;
a skimming plate pivotally attached to the displaceable structure;
a stop positioned to restrict the range of rotational displacement of the skimming plate to less than 90°; and
a displacement mechanism coupled with the displaceable structure to displace the skimming plate across molten solder in the reservoir to remove dross floating on the molten solder from the reservoir.

22. The soldering apparatus of claim 21, wherein the stop is in the form of a protrusion extending from the displaceable structure into the rotational path of the pivotally attached skimming plate.

23. The soldering apparatus of claim 21, wherein the displacement structure is a trolley mounted in a track, and wherein the displacement mechanism is coupled with the trolley to displace the trolley along the track.

24. The soldering apparatus of claim 21, further comprising a nozzle coupled with the reservoir to generate a wave of molten solder directed upward for application onto a substrate passing over the nozzle.

25. A method for removing dross from a reservoir containing molten solder, the method comprising:
providing a displaceable structure having a stop that positions a pivotally mounted skimming place, when the skimming plate is collapsed against the stop and the displaceable structure is displaced such that the stop leads the pivot, to penetrate into a bed of dross floating on molten solder;
displacing the displaceable structure across a molten solder bath in the reservoir such that the skimming plate collapses toward the displaceable structure to allow the plate to skim across the top of the dross floating on the molten solder bath; and
reversing the direction of the displaceable structure across the bed of dross, the stop positioning the skimming plate to penetrate into the dross, allowing the skimming plate to then rotate about the pivot to a position where the skimming plate can collect and remove the dross from the reservoir with the displacement of the displaceable structure in this reversed direction.

26. The method of claim 25, wherein the stop is in the form of a protrusion extending from the displaceable structure into the rotational path of the pivotally mounted skimming plate.

27. A soldering apparatus comprising:
a reservoir defining a cavity for containing molten solder and having a sidewall defining an outlet port through which dross can be removed from the surface of molten solder in the reservoir;
a displaceable structure mounted for reciprocal displacement across the cavity between positions proximate and distal the outlet port;
a skimming plate attached to the displaceable structure and configured to capture and remove dross from the surface of the molten solder when the displaceable structure is displaced from the distal position to the proximate position;
a displacement mechanism coupled with the displaceable structure to retractably displace the skimming plate across molten solder from the distal position to the proximate position within the reservoir; and a computer control system coupled with the displacement mechanism, the control system including a processor in communication with a computer-readable storage medium storing software code for instructing the displacement mechanism to displace the skimming plate from the position proximate the outlet port, wherein with each displacement, the skimming plate extends to a position further from the outlet port such that segments of the dross are removed incrementally starting with a segment of the dross proximate the outlet port.

* * * * *